(12) United States Patent
Sun (10) Patent No.: US 10,896,009 B1
(45) Date of Patent: Jan. 19, 2021

(54) IMAGE FORMING SYSTEM, IMAGE FORMING APPARATUS, AND SETTING METHOD THAT INCREASE EFFICIENCY OF SETTINGS

(71) Applicant: KYOCERA Document Solutions Inc., Osaka (JP)

(72) Inventor: Changsong Sun, Concord, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/670,920

(22) Filed: Oct. 31, 2019

(51) Int. Cl.
*G06F 3/12* (2006.01)

(52) U.S. Cl.
CPC .......... *G06F 3/1222* (2013.01); *G06F 3/1231* (2013.01); *G06F 3/1238* (2013.01); *G06F 3/1257* (2013.01); *G06F 3/1261* (2013.01)

(58) Field of Classification Search
None
See application file for complete search history.

(56) References Cited

U.S. PATENT DOCUMENTS

| | | | |
|---|---|---|---|
| 9,514,398 B2 | 12/2016 | Akiyama et al. | |
| 2013/0194630 A1* | 8/2013 | Kishimoto | G06F 3/1285 358/1.15 |
| 2015/0007279 A1* | 1/2015 | Hattori | H04L 63/0838 726/5 |
| 2017/0168765 A1* | 6/2017 | Fan | G06F 3/1287 |
| 2018/0349075 A1* | 12/2018 | Inoue | G06F 3/1204 |

\* cited by examiner

*Primary Examiner* — Frantz Bataille
(74) *Attorney, Agent, or Firm* — Hawaii Patent Services; Nathaniel K. Fedde; Kenton N. Fedde

(57) ABSTRACT

Provided is an image forming system that sets up setting data, efficiently. A target selecting part selects an image forming apparatus serving as a target that sets up setting data first and the other image forming apparatus serving as a target that retransmits the setting data. A setting transmitting part transmits the setting data to the image forming apparatus selected as the target to set up first. A setting checking part checks that setting data have been set to the image forming apparatus. A setting receiving part receives the setting data. A setting part sets up the received setting data. A setting retransmitting part retransmits the setting data to other image forming apparatus selected as a retransmitting target. An informing part notifies a server that setting data having been set to the image forming apparatus and/or the other image forming apparatus to a server.

15 Claims, 7 Drawing Sheets

IMAGE FORMING SYSTEM, IMAGE FORMING APPARATUS, AND SETTING METHOD THAT INCREASE EFFICIENCY OF SETTINGS

BACKGROUND

The present disclosure is related with the image forming system, image forming apparatus, and setting method, and, especially, an image forming system, an image forming apparatus, and a setting method, that manage settings of the image forming apparatus.

An image forming apparatus, such as an MFP (Multifunctional Peripheral) which can print a document and an image, is present.

As typical technology, a printing system including a plurality of printers (image forming apparatus) is disclosed. A printer setting changing part of this printing system changes settings of the printing machine in order to satisfy a security requirement based on instructions of the changing settings by a printing machine changing-settings indication unit of a managing server.

SUMMARY

An image forming system of the present disclosure is an image forming system having an image forming apparatus and a server that manages the image forming apparatus, comprising: the server includes a target selecting part configured to select the image forming apparatus serving as a target to set up setting data first, and other image forming apparatuses serving as a retransmitting target of the setting data, a setting transmitting part configured to transmit the setting data to the image forming apparatus selected as the target to set up first by the target selecting part, and a setting checking part configured to check that the setting data is set to the image forming apparatus; and the image forming apparatus includes a setting receiving part configured to receive the setting data, a setting part configured to set up the setting data received by the setting receiving part, a setting retransmitting part configured to retransmit the setting data to the other image forming apparatus selected as the retransmitting target, and an informing part configured to notify the server that the setting data is set to the image forming apparatus and/or the other image forming apparatus.

An image forming apparatus of the present disclosure is an image forming apparatus comprising: a setting receiving part configured to receive setting data from a server for management; a setting part configured to set up the setting data received by the setting receiving part; a setting retransmitting part configured to check a state where other image forming apparatus is in a receivable state of the setting data, set to the other image forming apparatus as a retransmitting target when being in the receivable state, and retransmits the setting data; and an informing part configured to notify the server that the setting data is set to the image forming apparatus and/or the other image forming apparatus.

A setting method of the present disclosure is a setting method executed by an image forming system having an image forming apparatus and a server that manages the image forming apparatus, comprising the steps of: by the server, selecting the image forming apparatus serving as a target to set up setting data first; by the server, transmitting the setting data to the image forming apparatus selected as the target set up first; by the image forming apparatus, receiving the setting data; by the image forming apparatus, setting the received setting data; by the server, selecting other image forming apparatus serving as a retransmitting target the setting data; by the image forming apparatus, retransmitting the setting data to the other image forming apparatus selected as the retransmitting target; by the image forming apparatus and/or the other image forming apparatus, notifying to the server that the setting data is set up; and by the server, checking that the setting data is set to the image forming apparatus.

DETAILED DESCRIPTION

Embodiment

[System Configuration of Image Forming System X]

Figure 1:
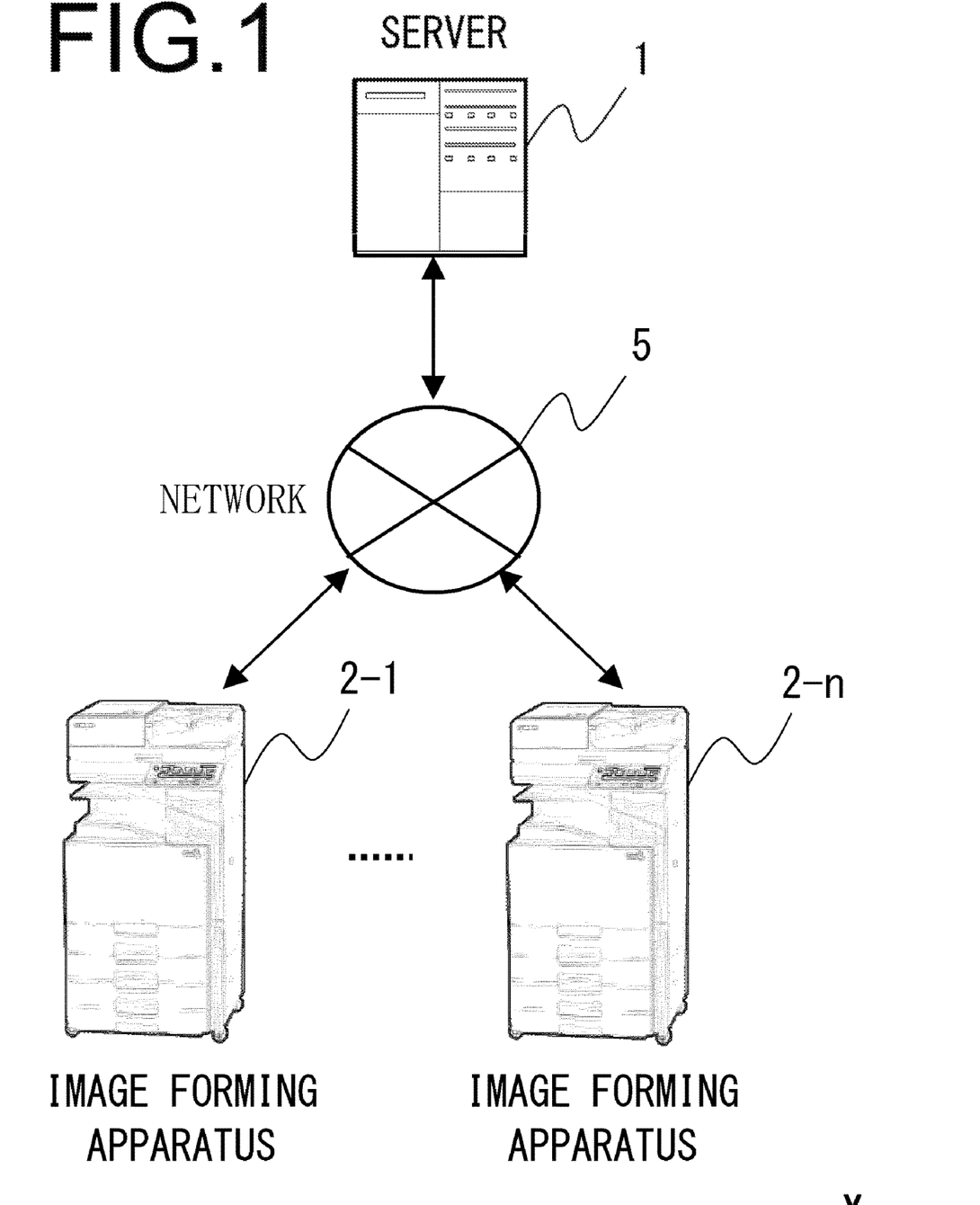
FIG. 1 is a system configuration figure of an image forming system according to the embodiment of the present disclosures.
Figure 2:
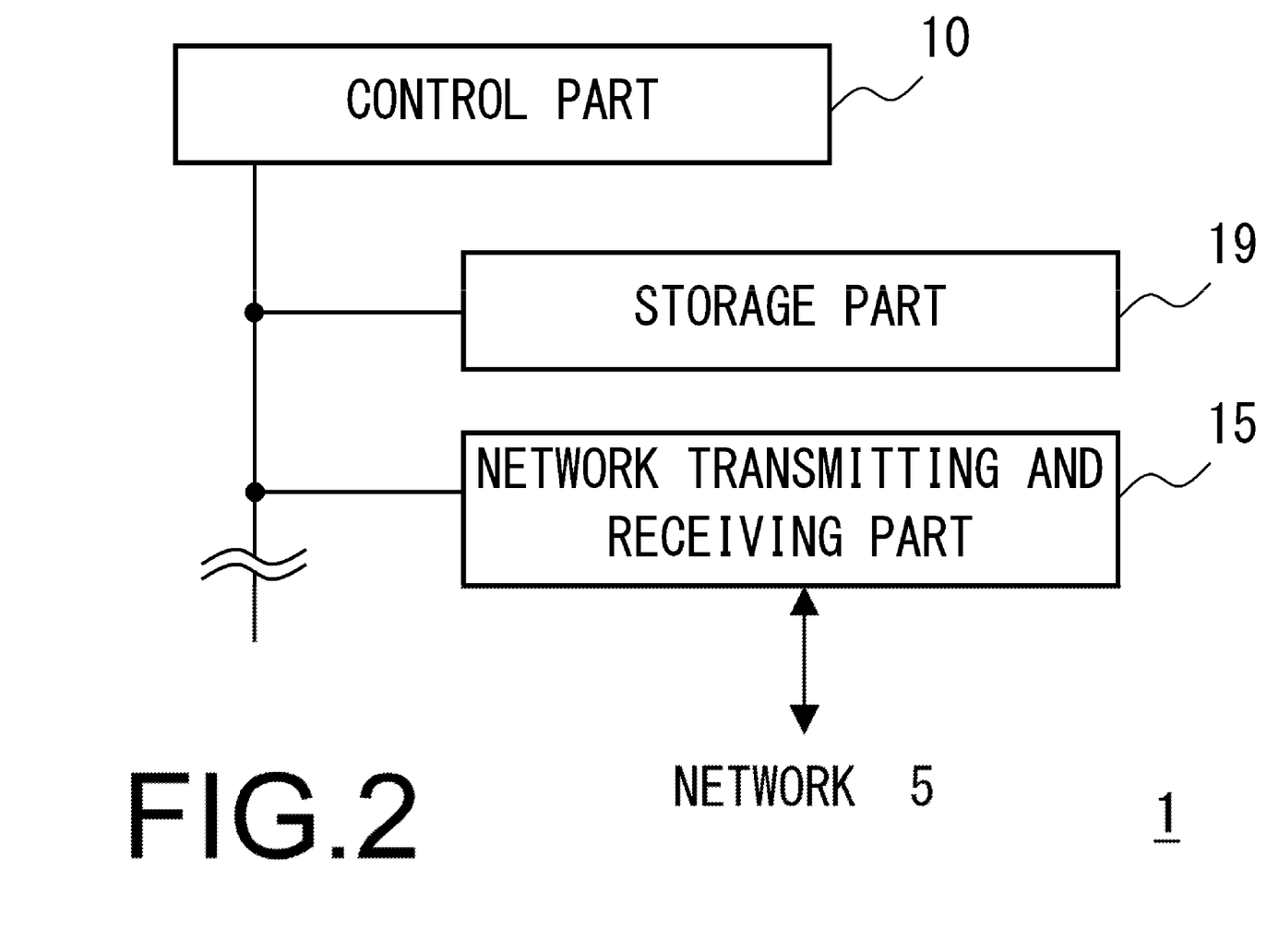
FIG. 2 is a block diagram showing a control configuration of the server as shown in FIG. 1.
Figure 3:
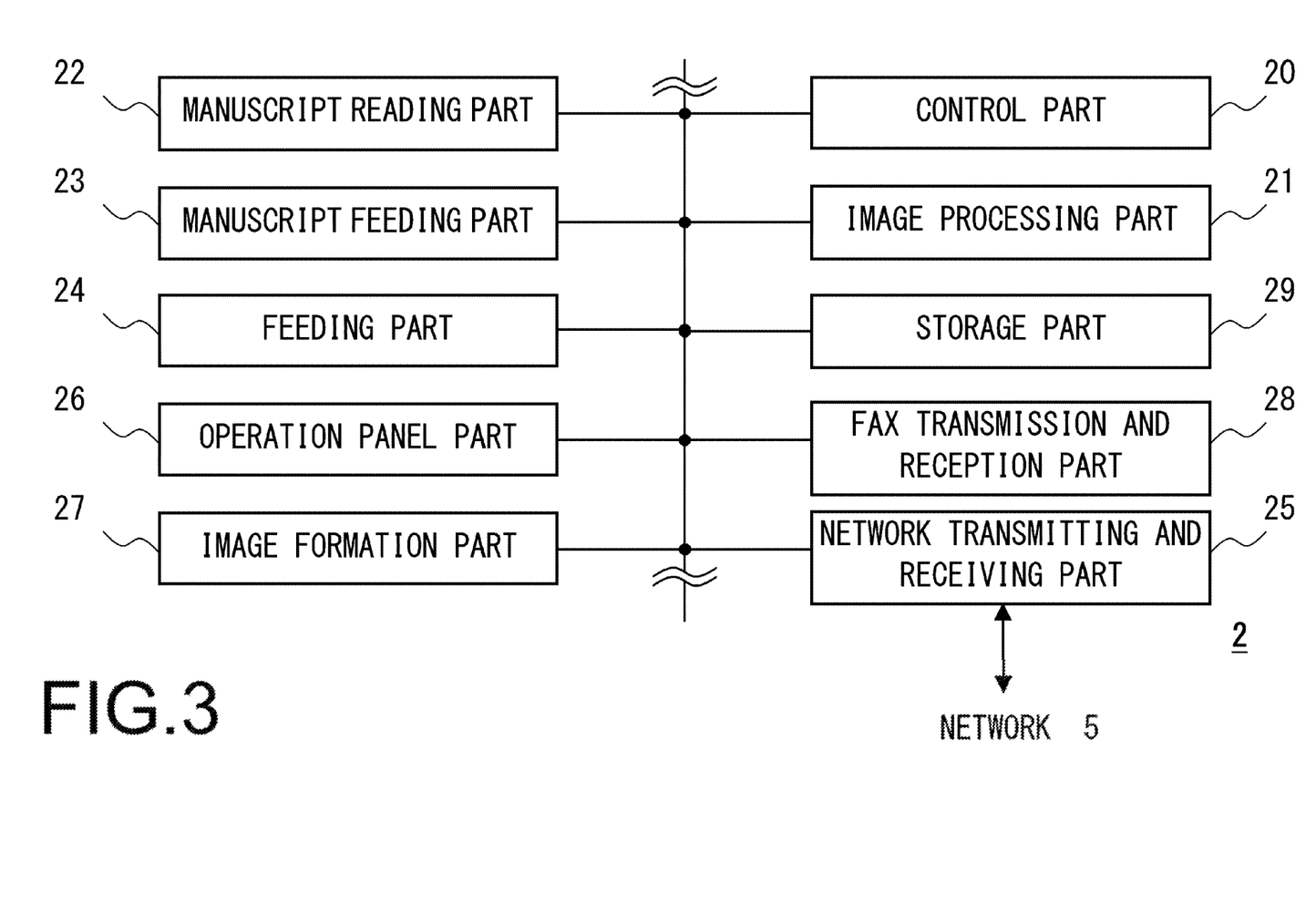
FIG. 3 is a block diagram showing a control configuration of the image forming apparatus as shown in FIG. 1.

First, with reference to FIG. 1-FIG. 3, a system configuration of image forming system X is explained. Image forming system X according to the embodiment of the present disclosures is configured that server 1, and a plurality of image forming apparatuses 2-1-image forming apparatus 2-$n$ are connected with network 5. In addition, when indicating any one of these plural items, it is simply described as image forming apparatus 2 in the following. The same applies to the configuration of the numerals to which other hyphens are added.

Server 1 is a server for management that performs renewal of firmware, management of expendable supplies, a system management, or the like, for image forming apparatus 2. In the present embodiment, server 1 is configured with a main frame, a PC (Personal Computer), or the like.

Image forming apparatus 2 is an document reading apparatus, such as an MFP, a network scanner, a document scanner, network FAX, and a printer with a scanner function, or the like. Image forming apparatus 2 can execute an application software (only henceforth "application") for connecting with server 1.

Network 5 includes, in the present embodiment, intranet configured by LAN (Local Area Network) that can transmit and receive various data at high speed, an exclusive line, or the like, and a so-called network of "cloud", such as WAN (Wide Area Network) that includes the Internet, a mobile phone network, or the like. Further, network 5 may be connectable with a specific port and protocol via a router, a gateway, or the like. Also, network 5 may form VPN (Virtual Private Network).

Then, as refer to FIG. 2, server 1 includes control part 10, network transmitting and receiving part 15, and storage part 19.

Control part 10 is an information processing unit, such as GPP (General Purpose Processor), CPU (Central Processing Unit), MPU (Micro Processing Unit), DSP (Digital Signal Processor), GPU (Graphics Processing Unit), ASIC (Application Specific Integrated Circuit, processor for particular applications), or the like. Control part 10 reads the control program stored in ROM, SSD, or HDD, of storage part 19, expands this control program to RAM, executes it, and is operated as each unit of the functional block as described later.

Network transmitting and receiving part 15 is a network connection unit including a LAN board, a wireless transmitter receiver, or the like, for connecting with network 5.

Storage part 19 is a memory unit by using a non-transitory recording medium. Storage part 19 may include RAM (Random Access Memory), or the like, as a main memory part. Also, storage part 19 may be include ROM (Read Only Memory), flash memories, such as eMMC (embedded Multi-Media Card), SSD (Solid State Drive), or the like, HDD (Hard Disk Drive), or the like, as an auxiliary memory part. In this case, a control program for operation-controlling image forming apparatus 2 is stored in the auxiliary memory part of storage part 19. Also, the area of the document box (a storage folder, a shared folder) for each user may be included in storage part 19. Also, storage part 19 may store information about the performance and the function of server 1. In addition, storage part 19 may include external storages, such as various flash memories and an optical recording medium.

In addition, control part 10 may include build-in RAM, ROM, a flash memory, or the like.

Then, as refer to FIG. 3, image forming apparatus 2 includes image processing part 21, manuscript reading part 22, manuscript feeding part 23, feeding part 24, network transmitting and receiving part 25, operation panel part 26, image formation part 27 (image forming unit), FAX transmission and reception part 28, and the storage part 29, or the like. Each part is connected to control part 20 and is operation-controlled by control part 20.

Control parts 20 are information processing unit, such as GPP, CPU, MPU, DSP, GPU, ASIC, or the like. Control part 20 reads the control program stored in an auxiliary memory part of storage part 29, expands this control program to a main memory part, executes it, and is operated as each unit of the functional block as described later. Also, control part 20 controls a whole device corresponding to the specified instructions information inputted from an external terminal or operation panel part 26.

Image processing part 21 is a control arithmetic unit, such as DSP (Digital Signal Processor), GPU (Graphics Processing Unit), or the like. Image processing part 21 is a means to perform specified image processing for image data. Image processing part 21 performs various image processing, for example, such as blank page detection, scaling rotation, concentration tuning, gradation adjustment, noise rejection, sharpness, other image quality improvement, or the like. Image processing part 21 stores the image read by manuscript reading part 22 to storage part 29 as print data. In this case, image processing part 21 can also convert print data into a file unit of a format of PDF, TIFF, or the like. Also, image processing part 21 may be provided with an OCR function, accelerating function of OCR, or the like. Also, image processing part 21 may be provided with a function to read a bar code, a dotted image, or the like. In this case, image processing part 21 can also output a character, a figure, a table, a bar code, a dotted image, or the like, which is read, with a file unit.

Manuscript reading part 22 is a unit to read (scan) the set manuscript. Also, manuscript reading part 22 is arranged on the upper part of the body part of image forming apparatus 2. Manuscript reading part 22 is provided with a scanner, platen glass, and a manuscript reading slit. When reading the manuscript placed on the platen glass, manuscript reading part 22 moves a scanner to the position that faces to the platen glass and read with scanning the manuscript placed on platen glass to acquire image data, and outputs the acquired image data to control part 20.

Also, when reading the manuscript fed from manuscript feeding part 23, manuscript reading part 22 moves the scanner to the position that faces the manuscript reading slit. Then, manuscript reading part 22 reads the manuscript through the manuscript reading slit with synchronizing the conveying operation of the manuscript by manuscript feeding part 23 and acquires image data. Manuscript reading part 22 outputs the acquired image data to control part 20.

Manuscript feeding part 23 is a unit to convey the manuscript read by manuscript reading part 22. Manuscript feeding part 23 is arranged on the upper part of manuscript reading part 22. Manuscript feeding part 23 is provided with the manuscript mounting part and the manuscript transport mechanism. Manuscript feeding part 23 feeds out the manuscript placed on the manuscript mounting part one by one by the manuscript transport mechanism and feeds the manuscript to manuscript reading part 22.

Feeding part 24 is a unit that feeds out one sheet of recording paper at a time to image formation part 27. Feeding part 24 is provided with the body part.

Network transmitting and receiving part 25 is a network connection unit including a LAN board, a wireless transmitter receiver, or the like, for connecting with network 5. Network transmitting and receiving part 25 transmits and receives data by the line for data communications and transmits and receives an audio signal by a voice call line.

Operation panel part 26 is provided with an input part, such as a button, a touch panel, or the like, and a display part, such as LCD (Liquid Crystal Display), an organic electroluminescence display, or the like. Also, operation panel part 26 is arranged in the front-side of image forming apparatus 2. The buttons of the input part of operation panel part 26 are a numeric keypad, a start button, a cancel button, a button for switching of operational mode, and a button to instruct for executing a job, or the like. The operational mode may be provided with a type of mode, such as a copy, a FAX transmission, a scanner, a network scanner, or the like. Also, a job may be a type, such as printing, transmitting, storing, and recording for the selected document. The input part of operation panel part 26 acquires an instruction of the various jobs of image forming apparatus 2 by a user. Also, by a user instruction acquired from operation panel part 26, inputting or changing each user information is possible.

Image formation part 27 is, by output instruction of the user, a unit to perform image formation from the data stored in storage part 29, read by manuscript reading part 22, or acquired from the external terminal to a recording paper. Image formation part 27 is provided with a photo conductor drum, an exposure part, a developing part, a transfer part, a fixing part, or the like. Image formation part 27 records a toner image on a recording paper by performing an image formation process that includes electrification, exposure, development, transfer, and fixing.

FAX transmission and reception part 28 is a unit that transmits and receives a facsimile. FAX transmission and reception part 28 can perform facsimile reception from other FAX equipment by a sound line, can preserve at storage part 29, and can perform image formation by image formation part 27. Also, FAX transmission and reception part 28 can convert the manuscript read by manuscript reading part 22 or data of network FAX transmitted from the external terminal to the image data and can perform facsimile transmission by the sound line to the other FAX equipment.

Storage part 29 is the memory unit by using non-transitory recording medium, such as semiconductor memory, which is ROM, RAM, or the like, HDD, or the like. RAM of storage part 29 may keep a memory content even in a power saving state by a function, such as self refreshing, or the like. The control program for operation-controlling image forming apparatus 2 is stored in ROM and HDD of storage part 29. In addition, storage part 29 may also store user account settings. Also, an area of the document box (a storage folder, a shared folder) for each user may be included in storage part 29. Furthermore, in storage part 29, key data, such as a secret key for decrypting onetime passcode 330 (FIG. 4) as described later, or the like, is included.

In addition, in image forming apparatus 2, control part 20 and image processing part 21 may be integrally formed as like CPU with built-in GPU, a chip-on module package, or the like. Also, control part 20 and image processing part 21 may include build-in RAM, ROM, a flash memory, or the like.

[Functional Configuration of Image Forming System X]

Figure 4:
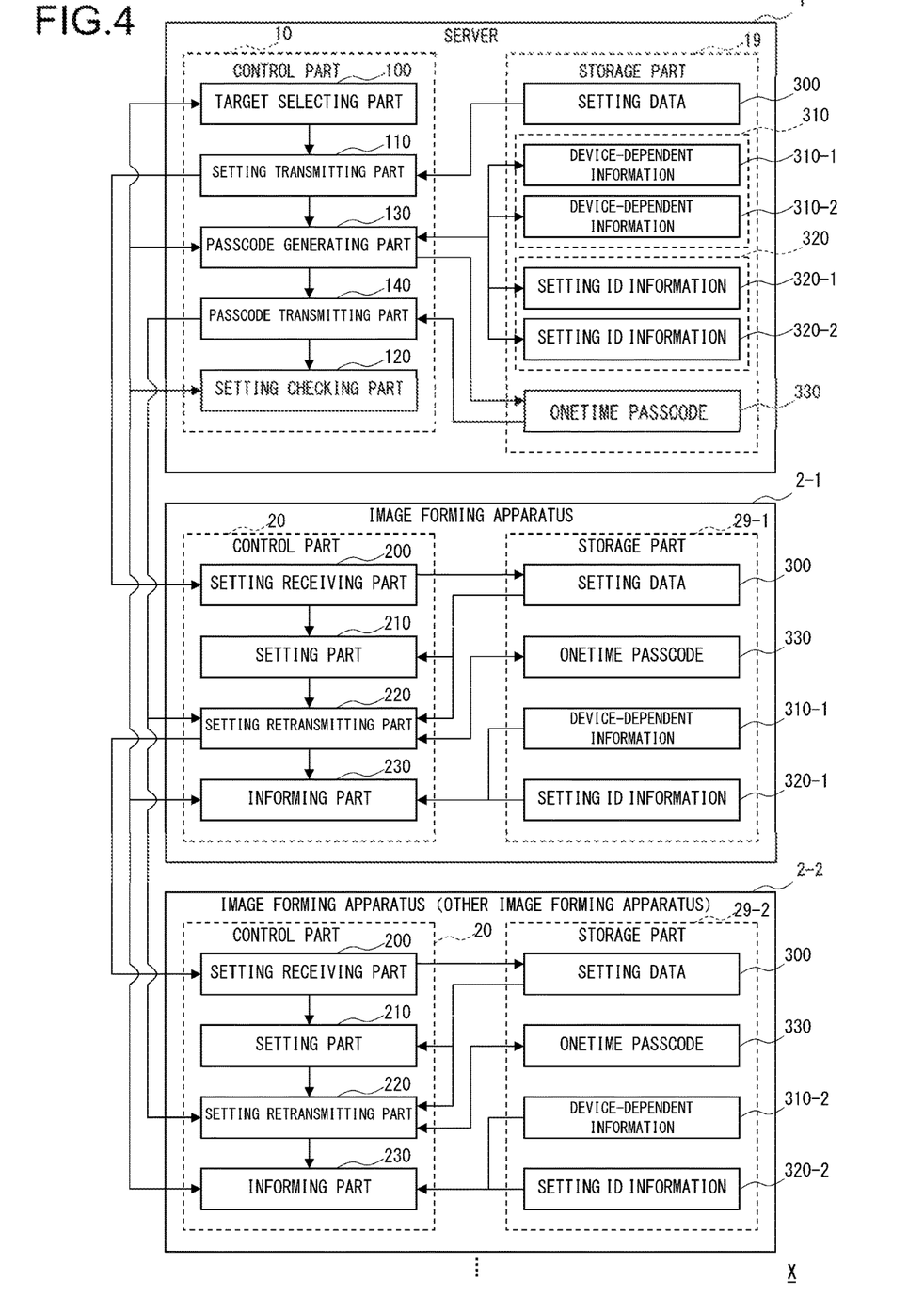
FIG. 4 is a block diagram showing the functional configuration of the image forming system as shown in FIG. 1.

Here, with reference to FIG. 4, a functional configuration of image forming system X according to the embodiment of the present disclosures is explained. With FIG. 4, as described later, an example that image forming apparatus 2-1 is image forming apparatus 2 serving as a target to set setting data 300 by server 1 is shown. Further, an example that image forming apparatus 2-2 is other image forming apparatus 2 serving as a retransmitting target of setting data 300 from image forming apparatus 2-1 is explained. The same applies to the following figures.

Control part 10 of server 1 is provided with target selecting part 100, setting transmitting part 110, setting checking part 120, passcode generating part 130, and passcode transmitting part 140. Storage part 19 stores setting data 300, device-dependent information 310-1, device-dependent information 310-2, setting ID information 320-1, setting ID information 320-2, and onetime passcode 330. Control part 20 of image forming apparatus 2-1, 2-2 are provided with setting receiving part 200, setting part 210, setting retransmitting part 220, and informing part 230. Storage part 29-1 of image forming apparatus 2-1 stores setting data 300, device-dependent information 310-1, setting ID information 320-1, and onetime passcode 330. Storage part 29-2 of image forming apparatus 2-2 stores setting data 300, device-dependent information 310-2, setting ID information 320-2, and onetime passcode 330. In addition, the data stored in storage part 19, 29-1, and 29-2 is changed according to advance of a process.

Target selecting part 100 selects image forming apparatus 2 that sets up setting data 300 first, and other image forming apparatus 2 that retransmits setting data 300. In addition, target selecting part 100 notifies image forming apparatus 2 about other image forming apparatus 2 that is allowed to be served as a retransmitting target. In the present embodiment, target selecting part 100 selects image forming apparatus 2-1 as a target that sets up setting data 300 first. Furthermore, target selecting part 100, checks other image forming apparatus 2 is in the state where it can receive setting data 300 (receivable state), when other image forming apparatus 2 is in the receivable state, target selecting part 100 selects the other image forming apparatus 2 as a retransmitting target of setting data 300. In the present embodiment, target selecting part 100 selects image forming apparatus 2-2 as a retransmitting target of setting data 300.

Setting transmitting part 110 transmits setting data 300 to image forming apparatus 2 selected as the target to set up first by target selecting part 100. In the present embodiment, setting transmitting part 110 transmits setting data 300 to image forming apparatus 2-1.

Setting checking part 120 checks that setting data 300 have been set to image forming apparatus 2. In the present embodiment, setting checking part 120 checks by acquiring the notice from each informing part 230 of image forming apparatus 2-1-2-*n*.

Passcode generating part 130 generates onetime passcode 330. In this case, passcode generating part 130 generates onetime passcode 330 based on device-dependent information 310 and setting ID information 320. In the present embodiment, passcode generating part 130 generates onetime passcode 330 based on device-dependent information 310-1, device-dependent information 310-2, setting ID information 320-1, and setting ID information 320-2.

Passcode transmitting part 140 transmits onetime passcode 330 generated by passcode generating part 130 to image forming apparatus 2 and other image forming apparatus 2.

Setting receiving part 200 receives setting data 300. Setting receiving part 200 can receive setting data 300 from image forming apparatus 2 and other image forming apparatus 2.

Setting part 210 sets up setting data 300 received by setting receiving part 200. Setting part 210 sets received setting data 300 to storage part 19.

Setting retransmitting part 220 retransmits setting data 300 to other image forming apparatus 2 selected as a retransmitting target. In the present embodiment, setting transmitting part 110 of anyone of image forming apparatus 2-1-2-*n* transmits setting data 300 stored in storage part 19 to any one of other image forming apparatus 2-2-2-*n*. Setting retransmitting part 220 receives onetime passcode 330 and retransmits setting data 300 only when verifying with other image forming apparatus 2.

Informing part 230 notifies server 1 that setting data 300 has been set up. In addition, informing part 230 can also transmit device-dependent information 310 and setting ID information 320 of image forming apparatus 2 and other image forming apparatus 2. In the present embodiment, informing part 230 of image forming apparatus 2-1 transmits device-dependent information 310-1 and setting ID information 320-1 to server 1. Informing part 230 of image forming apparatus 2-2 transmits device-dependent information 310-2 and setting ID information 320-2 to server 1.

Setting data 300 is data of various settings of image forming apparatus 2. By setting up setting data 300, various settings of image forming apparatus 2 can be changed. Setting data 300 includes, for example, firmware, various configuration data, or the like.

Device-dependent information 310 is data that is unique for each image forming apparatus 2. Device-dependent information 310 includes, for example, equipment information, a serial number, a MAC Address, firmware information, unique ID (Identification), or the like, for image forming apparatus 2. In the present embodiment, device-dependent information 310-1 is information of image forming apparatus 2-1, and device-dependent information 310-2 is information of image forming apparatus 2-2, respectively.

Setting ID information 320 is unique ID of the dedicated application for managing by server 1 in image forming system X, or the like. In setting ID information 320, different data is set up in each image forming apparatus 2. In the present embodiment, setting ID information 320-1 is information of image forming apparatus 2-1, and setting ID information 320-2 is information of image forming apparatus 2-2, respectively.

Onetime passcode 330 is data that is verifiable only in a short period between image forming apparatus 2 that retransmits setting data 300 and other image forming apparatus 2 that is retransmitted. Onetime passcode 330 is set up, for example, as a character string of a unique alphanumeric character, or the like.

Here, control part 10 of image forming apparatus 2 executes the control program stored in storage part 19 and is functioned as target selecting part 100, setting transmitting part 110, setting checking part 120, passcode generating part 130, and passcode transmitting part 140. Here, control part 20 of image forming apparatus 2 executes the control program stored in storage part 29 and is functioned as setting receiving part 200, setting part 210, setting retransmitting part 220, and informing part 230. Also, each part of above-mentioned image forming apparatus 2 serves as hardware resources to perform the image forming method of the present disclosure. In addition, the above-mentioned part or arbitrary combination of a functional configuration may be configured hardware-like or circuit-like by using an IC, a programmable logic, FPGA (Field-Programmable Gate Array), or the like.

[Setting Process by Image Forming System X]

Figure 5:
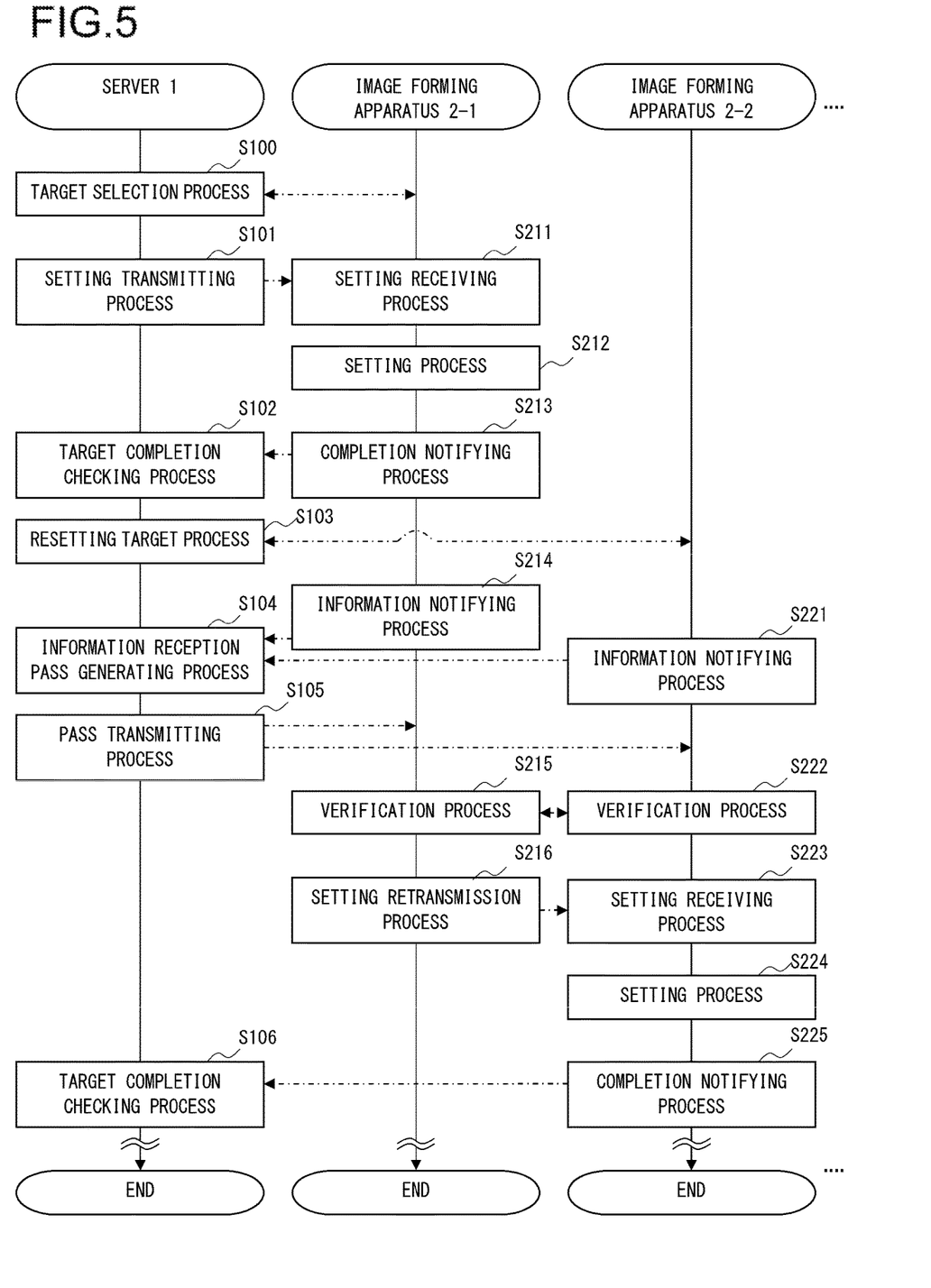
FIG. 5 is a flow chart of a setting process according to the embodiment of the present disclosures.
Figure 6:
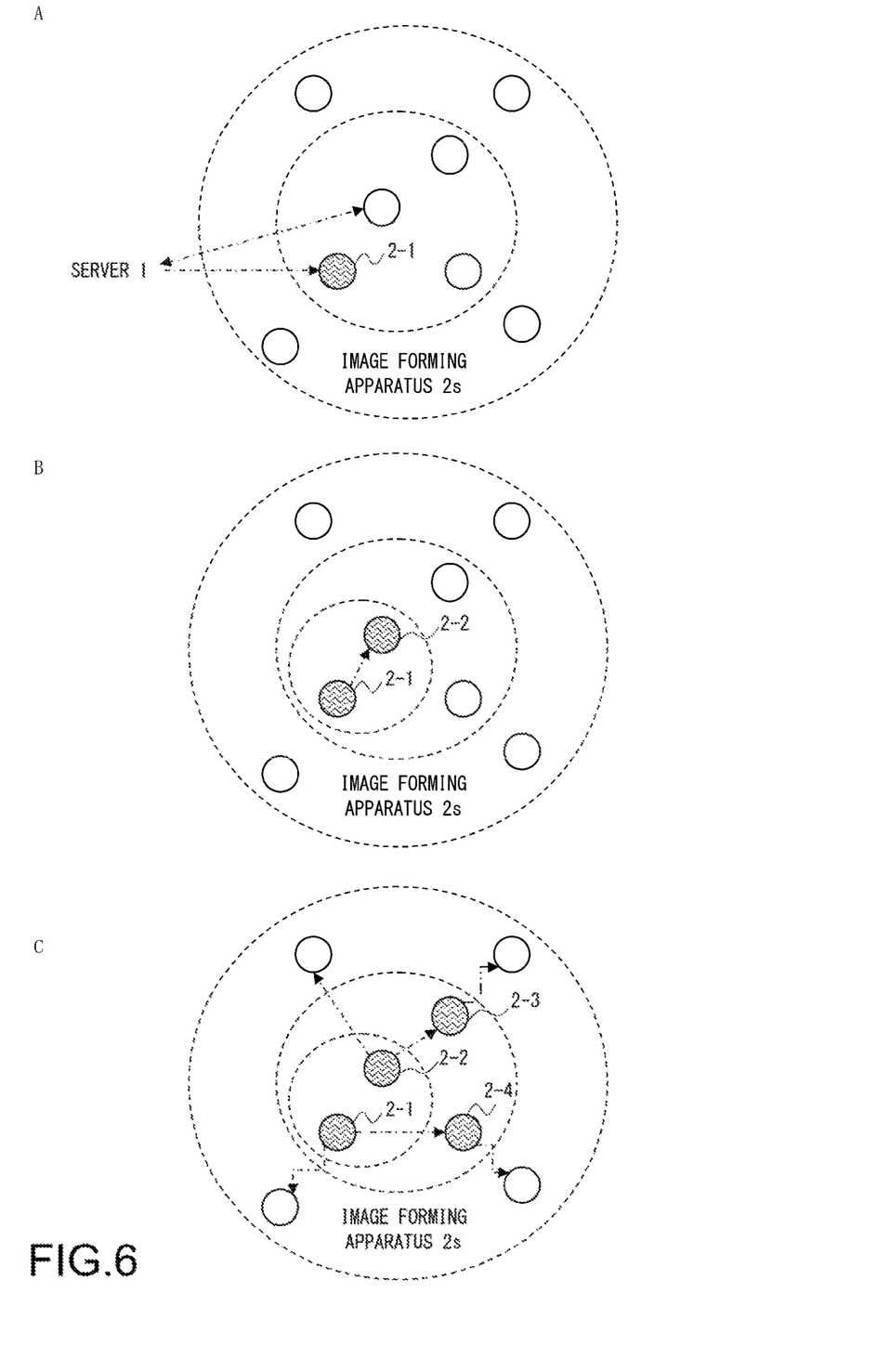
FIG. 6 is a conceptual diagram of retransmitting in the setting process as shown in FIG. 5.
Figure 7:
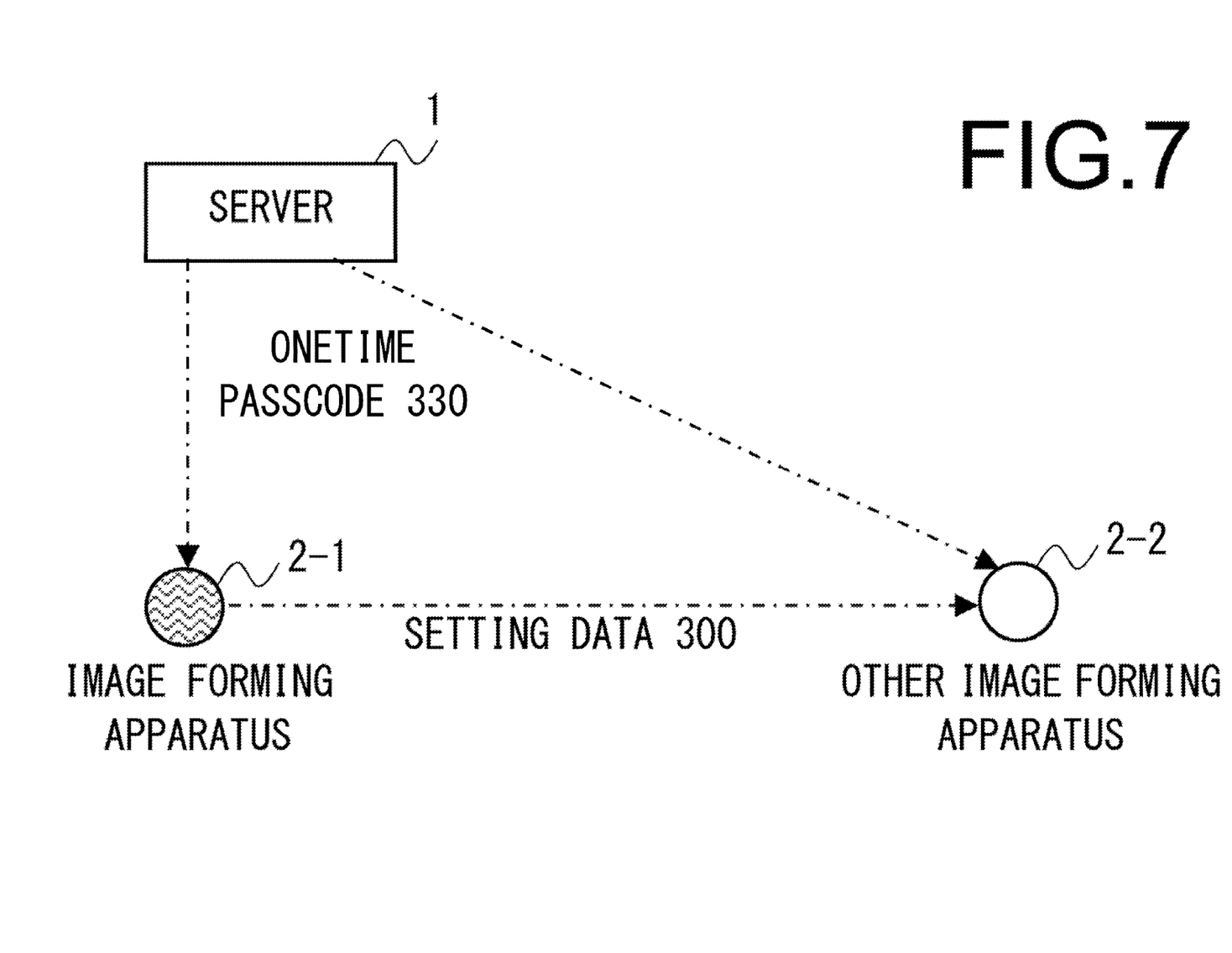
FIG. 7 is a conceptual diagram of verification of a onetime passcode in the setting process as shown in FIG. 5.

Then, with reference to FIG. 5-FIG. 7, a setting process by image forming apparatus 2 according to the embodiment of the present disclosures is explained. In the setting process of the present embodiment, image forming apparatus 2 that sets up setting data 300 first is selected by server 1. Then, setting data 300 is transmitted to selected image forming apparatus 2. Image forming apparatus 2 receives setting data 300. Then, received setting data 300 is set up. Next, server 1 checks that other image forming apparatus 2 is in the state where it can receive setting data 300. When it is in a receivable state, other image forming apparatus 2 is set to the retransmitting target. Setting data 300 is retransmitted from image forming apparatus 2, which the data is received. Then, image forming apparatus 2 notifies server 1 that setting data 300 has been set up and about other image forming apparatus 2 being selected as a target for retransmitting setting data 300. Server 1 checks that setting data 300 have been set to each image forming apparatus 2. In the setting process of the present embodiment, mainly, control part 10 of server 1 and control part 20 of image forming apparatus 2, respectively, executes the program stored in storage part 19 and storage part 29 with collaborating each part by using hardware resources. In the following, with reference to the flow chart of FIG. 5, the details of the setting process of the present embodiment are explained for each step.

(Step S100)

First, target selecting part 100 of server 1 performs a target selection process. Target selecting part 100 selects image forming apparatus 2 serving as a target to set up setting data 300 first. According to the present embodiment, target selecting part 100 selects image forming apparatus 2-1 as the target.

(Step S101)

Then, setting transmitting part 110 performs a setting transmitting process. According to the example of FIG. 6A, setting transmitting part 110 transmits setting data 300 to image forming apparatus 2-1 selected as the target to set up first. That is, server 1 itself is the source that transmits setting data 300 first. Here, in FIG. 6 A-C, each round mark shows image forming apparatus 2 that needs to set up setting data 300, each round mark of a dashed line shows a distance in network 5 from image forming apparatus 2-1, each arrow of a dashed dotted line shows data flow, respectively. In each round mark, the dark color shows image forming apparatus 2 that setting data 300 has been set up.

(Step S211)

Here, setting receiving part 200 of image forming apparatus 2-1 performs a setting receiving process. Setting receiving part 200 of image forming apparatus 2-1, which is selected as the target, receives setting data 300 from server 1 and stores it in storage part 19 as temporary data.

(Step S212)

Then, setting part 210 performs a setting process. Setting part 210 sets up setting data 300 stored in storage part 19. In this case, setting part 210 may set it up by executing the dedicated application.

(Step S213)

Then, informing part 230 performs a completion notifying process. Informing part 230 notifies server 1 of having performed the completion of a setting of the setting data 300.

(Step S102)

Here, setting checking part 120 of server 1 performs a target completion checking process. Setting checking part 120 checks that setting data 300 have been set to image forming apparatus 2-1.

(Step S103)

Then, target selecting part 100 of server 1 performs a resetting target process. Target selecting part 100 checks that other image forming apparatus 2 is in the state where it can receive setting data 300 (receivable state), and when it is in the receivable state, selects the other image forming apparatus 2 as a retransmitting target. In this case, target selecting part 100 selects the other image forming apparatus 2, which exists at a short distance on network 5 from image forming apparatus 2 having already set up setting data 300, as the retransmitting target. Further, target selecting part 100 transmits the information of the other image forming apparatus 2 selected as the retransmitting target to the image forming apparatus 2. Setting retransmitting part 220 of image forming apparatus 2 receives the information of the other image forming apparatus 2 selected as the retransmitting target. According to FIG. 6A, target selecting part 100 selects image forming apparatus 2-2 that has short distance from image forming apparatus 2-1 as the retransmitting target. Target selecting part 100 notifies that effect to image forming apparatus 2-1 serving as the source of retransmitting.

(Step S214)

Here, informing part 230 of image forming apparatus 2-1 performs an information notifying process. Informing part 230 of image forming apparatus 2-1 transmits device-dependent information 310-1 and setting ID information 320-1 to server 1.

(Step S221)

On the other hand, informing part 230 of image forming apparatus 2-2 also performs a information notifying process. Informing part 230 of image forming apparatus 2-2 transmits device-dependent information 310-2 and setting ID information 320-2 to server 1.

(Step S104)

Here, passcode generating part 130 of server 1 performs information reception pass generating process. Passcode generating part 130 generates onetime passcode 330 based on device-dependent information 310-1, device-dependent information 310-2, setting ID information 320-1, and setting ID information 320-2. Passcode generating part 130 generates onetime passcode 330, for example, by using a HOTP or a TOTP algorithm, or the like. This onetime passcode 330 is generated to be effective only for a short time between the source and the target.

(Step S105)

Then, passcode transmitting part 140 performs a pass transmitting process. Passcode transmitting part 140 transmits onetime passcode 330 to image forming apparatus 2-1 and other image forming apparatus 2-2.

(Steps S215 and S222)

Here, setting retransmitting part 220 of image forming apparatus 2-1 and image forming apparatus 2-2 performs verification process. According to FIG. 7, setting retransmitting part 220 of image forming apparatus 2-1 verifies by decrypting onetime passcode 330 with the secret key stored in storage part 19. In addition, setting retransmitting part 220 of image forming apparatus 2-2 also verifies by decrypting onetime passcode 330 with the secret key stored in storage part 19. When the verification is completed, image forming apparatus 2-1 and image forming apparatus 2-2 notify the completion of authentication, mutually. In addition, if authentication is failed here, image forming apparatus 2-1 and image forming apparatus 2-2 notify server 1 that effect and end the setting process.

(Step S216)

Here, setting retransmitting part 220 of image forming apparatus 2-1 performs setting retransmission process. Here, setting retransmitting part 220 retransmits setting data 300 only when onetime passcode 330 is received and is verified with other image forming apparatuses 2. According to FIG. 6B, setting retransmitting part 220 retransmits setting data 300 stored in storage part 19 to image forming apparatus 2-2.

(Step S223)

Here, setting receiving part 200 of image forming apparatus 2-2 performs a setting receiving process. Setting receiving part 200 receives setting data 300 that is retransmitted from image forming apparatus 2-1.

(Step S224)

Then, setting part 210 performs a setting process. This process is performed as like Step S212.

(Step S225)

Then, informing part 230 performs a completion notifying process. This process is also performed as well as Step S213.

(Step S106)

Here, setting checking part 120 of server 1 performs a target completion checking process. Setting checking part 120 checks that setting data 300 is retransmitted from image forming apparatus 2-1, which is the source, to image forming apparatus 2-2, which is selected as the retransmitting target and it has been set up.

Hereinafter, the process of these retransmitting is repeated between other image forming apparatus 2, which is a source, and other image forming apparatus 2, which is a target. According to FIG. 6C, image forming apparatus 2-2 transmits setting data 300 to the nearest image forming apparatus 2-3 on network 5 as a retransmitting target. Furthermore, image forming apparatus 2-1 transmits setting data 300 to the next nearest image forming apparatus 2-4 as a retransmitting target. As shown in the dashed dotted line of the polygonal line, these processes are repeated, and the process about all the image forming apparatuses 2 that is necessary to set up setting data 300 is completed. As the above-mentioned, the setting process according to the embodiment of the present disclosures is ended.

The following effects can be obtained as configured as mentioned above. In typical technology, in order to transmit setting changes to a plurality of image forming apparatuses, a service person is required to set and transmit one by one. That is, the changing settings of all the image forming apparatuses are performed by using a server. Therefore, the load on the server made it impossible to set up, efficiently, in a large-scale image forming system. As compared with this, image forming system X which according to the embodiment of the present disclosures is provided with image forming apparatus 2 and server 1 that manages respective image forming apparatus 2. Server 1 includes target selecting part 100 that selects image forming apparatus 2 serving as a target to set up setting data 300 first, and other image forming apparatus 2 serving as a retransmitting target of setting data 300, a setting transmitting part 110 that transmits of setting data 300 to image forming apparatus 2 selected as the target to set up first by target selecting part 100, and a setting checking part 120 that checks that setting data 300 is set to the image forming apparatus 2. Image forming apparatus 2 includes a setting receiving part 200 that receives the setting data 300, a setting part 210 that sets up setting data 300 received by setting receiving part 200, a setting retransmitting part 220 that retransmits setting data 300 to the other image forming apparatus 2 selected as the retransmitting target, an informing part 230 that notifies server 1 that setting data 300 is set to image forming apparatus 2 and/or the other image forming apparatus 2 determined to retransmit setting data 300. As configured in this way, image forming apparatus 2 that setting data 300 has already been set up is transmission-source of a setting data 300, and setting data 300 can be retransmitted to other image forming apparatus 2. Therefore, the efficiency of setting for setting data 300 in the whole system can be increased, and the load of server 1 can be decreased.

Also, server 1 of image forming system X according to the embodiment of the present disclosures further includes: a passcode generating part 130 that generates onetime passcode 330, and a passcode transmitting part 140 that transmits onetime passcode 330 generated by passcode generating part 130 to image forming apparatus 2 and other image forming apparatus 2. Then, setting retransmitting part 220 retransmits setting data 300 only when onetime passcode 330 is received and verified between other image forming apparatuses 2. As configured in this way, the retransmitting can be performed, simply, by onetime passcode 330.

Also, in image forming system X according to the embodiment of the present disclosures, informing part 230 notifies device-dependent information 310 and setting ID information 320 of image forming apparatus 2 and other image forming apparatus 2. Passcode generating part 130 generates onetime passcode 330 based on device-dependent information 310 and setting ID information 320. As configured in this way, by device-dependent information 310 and setting ID information 320, a safe passcode is generable. Thereby, even if setting data 300 is retransmitted between image forming apparatuses 2, the possibility of hacking, or the like, can be reduced.

Also, in image forming system X according to the embodiment of the present disclosures, target selecting part 100 notifies image forming apparatus 2 about other image forming apparatus 2 allowing to serve as the retransmitting target. As configured in this way, even if the retransmitting target between image forming apparatuses 2 is not selected, retransmitting by the instruction from server 1 becomes possible.

OTHER EMBODIMENTS

In addition, in the above-mentioned embodiment, an example that notifies other image forming apparatus 2 serving as the retransmitting target by target selecting part 100 is explained. However, transmission destination information of other image forming apparatus 2 selected as the retransmitting target may be included in onetime passcode 330 by passcode generating part 130. This transmission destination information may include, for example, network address information such as the IP address and MAC address, or the like, of other image forming apparatus 2, and other data necessary for retransmission. As configured in this way, even if target selecting part 100 does not notify, separately, image forming apparatus 2 serving as the source can obtain the transmission destination information of other image forming apparatus 2 serving as the retransmitting target and can retransmit.

In addition, in the above-mentioned embodiment, an example of authenticating with onetime passcode 330 between image forming apparatus 2 serving as the source of setting data 300 and other image forming apparatuses 2 serving as the target to retransmit has been described. However, instead of onetime passcode 330, authentication information such as account ID and a password of other image forming apparatus 2 may be transmitted to image forming apparatus 2 serving as the source. As configured in this way, even if authentication by onetime passcode 330 is not performed, retransmission can be performed from the source to the target. In this case, if authentication information includes the above-mentioned transmission destination information, server 1 can retransmit setting data 300 to the target only by transmitting this information.

Furthermore, in the above-mentioned embodiment, an example that selects other image forming apparatus 2 serving as a target to retransmit by server 1 has been described. However, other image forming apparatus 2 for retransmitting may be selected by image forming apparatus 2 itself as the source. In this case, setting retransmitting part 220 of image forming apparatus 2 serving as the source checks whether other image forming apparatus 2 is in the state of being receivable setting data 300. Further, if other image forming apparatus 2 is in the state of being receivable, setting retransmitting part 220 selects the other image forming apparatus 2 as the retransmitting target and retransmits setting data 300. As configured in this way, the burden on server 1 can be further reduced, and setting data 300 can be retransmitted. In addition, in this case, informing part 230 may notify server 1 about other image forming apparatus 2 selected to be retransmitted setting data 300, and setting checking part 120 of server 1 may be grasped it.

Also, the present disclosure is applicable also to information processing apparatus other than an image forming apparatus. That is, a configuration by using a network scanner, a server, or the like, which is connected with the scanner, separately, by USB or the like, may be applicable.

Also, the configuration and operation of the above-mentioned embodiment are an example, and it cannot be overemphasized that it can change suitably and can execute in the range that does not deviate from the aim of the present disclosure.

What is claimed is:

1. An image forming system having an image forming apparatus and a server that manages the image forming apparatus, wherein:

the server includes a target selecting part configured to select the image forming apparatus serving as a target to set up setting data first, and an other image forming apparatus serving as a retransmitting target of the setting data, and wherein the server is configured to transmit, to the image forming apparatus via a network, transmission destination information of the other image forming apparatus, a setting transmitting part configured to transmit the setting data to the image forming apparatus selected as the target to set up first by the target selecting part, and a setting checking part configured to check that the setting data is set to the image forming apparatus; and the image forming apparatus includes a setting receiving part configured to receive the setting data, a setting part configured to set up the setting data received by the setting receiving part, a setting retransmitting part configured to receive the transmitted transmission destination information via the network, and retransmit the setting data via the network to the other image forming apparatus selected as the retransmitting target, and an informing part configured to notify the server that the setting data is set to the image forming apparatus and/or the other image forming apparatus.

2. The image forming system according to claim 1, wherein the server further includes:

a passcode generating part configured to generate a onetime passcode, and a passcode transmitting part configured to transmit the onetime passcode generated by the passcode generating part to the image forming apparatus and the other image forming apparatus; and wherein the setting retransmitting part retransmits the setting data only when the onetime passcode is received and is verified between the image forming apparatus and the other image forming apparatus.

3. The image forming system according to claim 2, wherein the informing part notifies device-dependent information and setting ID information of the image forming apparatus and the other image forming apparatus; and the passcode generating part is configured to generate the onetime passcode based on the device-dependent information and the setting ID information.

4. The image forming system according to claim 1, wherein the target selecting part notifies the image forming apparatus about the other image forming apparatus being allowed to serve as a retransmitting target.

5. An image forming apparatus comprising:

a setting receiving part configured to receive setting data from a server for management;

a setting part configured to set up the setting data received by the setting receiving part;

a setting retransmitting part configured to receive transmission destination information of an other image forming apparatus via a network, check a state where the other image forming apparatus is in a receivable state of the setting data, set the other image forming apparatus as a retransmitting target based on the transmission destination information when being in the receivable state, and retransmit the setting data to the other image forming apparatus via the network; and an informing part configured to notify the server that the setting data is set to the image forming apparatus and/or the other image forming apparatus.

6. The image forming apparatus according to claim 5, wherein the setting retransmitting part retransmits the setting data only when onetime passcode is received and is verified between the image forming apparatus itself and the other image forming apparatus.

7. The image forming apparatus according to claim 6, wherein the informing part notifies device-dependent information and setting ID information of the image forming apparatus and the other image forming apparatus; and the onetime passcode is based on the device-dependent information and the setting ID information.

8. The image forming apparatus according to claim 5, wherein the setting retransmitting part receives information of the other image forming apparatus selected as the retransmitting target.

9. A setting method executed by an image forming system having an image forming apparatus and a server that manages the image forming apparatus, comprising the steps of:

by the server, selecting the image forming apparatus serving as a target to set up setting data first;

by the server, transmitting the setting data to the image forming apparatus selected as the target set up first;

by the image forming apparatus, receiving the setting data;

by the image forming apparatus, setting the received setting data;

by the server, selecting an other image forming apparatus serving as a retransmitting target the setting data;

by the server, transmitting transmission destination information of the other image forming apparatus via a network;

by the image forming apparatus, retransmitting the setting data to the other image forming apparatus selected as the retransmitting target via the network based on the transmission destination information;

by the image forming apparatus and/or the other image forming apparatus, notifying to the server that the setting data is set up; and by the server, checking that the setting data is set to the image forming apparatus.

10. The setting method according to claim 9, further comprising the steps of:

by the server, generating a onetime passcode;

by the server, transmitting the onetime passcode to the image forming apparatus and the other image forming apparatus; and by the image forming apparatus, retransmitting the setting data only when the onetime passcode is received and is verified between the image forming apparatus and the other image forming apparatus.

11. The setting method according to claim 10, further comprising the steps of:

by image forming apparatus, notifying device-dependent information and setting ID information of the image forming apparatus and the other image forming apparatus; and by the server, generating the onetime passcode based on the device-dependent information and the setting ID information.

12. The setting method according to claim 9, further comprising a step of:

by the server, notifying the image forming apparatus about the other image forming apparatus being allowed to serve as a retransmitting target.

13. The image forming system according to claim 2, wherein the transmission destination information is included in the onetime passcode; and the transmission destination information comprises network address information of the other image forming apparatus.

14. The image forming apparatus according to claim 6, wherein the transmission destination information is included in the onetime passcode; and the transmission destination information comprises network address information of the other image forming apparatus.

15. The setting method according to claim 10, wherein the transmission destination information is included in the onetime passcode; and the transmission destination information comprises network address information of the other image forming apparatus.

* * * * *